2,752,395

CARBONYLATION OF OLEFIN-DIOLEFIN MIXTURES; SELECTIVE DIOLEFIN REMOVAL

Philip Geoffrey Harvey and Sidney Arthur Lamb, Norton-on-Tees, England, assignors to Imperial Chemical Industries Limited, a corporation of Great Britain No Drawing. Application August 21, 1950,
Serial No. 180,706

Claims priority, application Great Britain
September 12, 1949

8 Claims. (Cl. 260—604)

This invention relates to the production of oxygen-containing organic compounds.

We have found that it is difficult to carbonylate certain hydrocarbon mixtures, for example those derived from cracked paraffin waxes owing to the presence in them of di- and/or poly-enes.

According to the invention oxygen-containing compounds, especially aldehydes, are produced from alkene mixtures containing also di- and/or poly-enes, which may be aliphatic or alicyclic, by removing from the mixture said di- and/or poly-enes and then carbonylating the resultant liquid mixture at superatmospheric temperature with a mixture of carbon monoxide and hydrogen in which the molar ratio $CO:H_2$ is at least 1:4 and preferably at least 1:3 under superatmospheric pressure in the presence of sufficient, preferably at least 0.1% by weight of cobalt metal in suspended form or dissolved in said liquid. The temperature and pressure commonly used in the carbonylation (Oxo) reaction may in general be used.

The process of the invention is specially applicable to mixtures containing from $C_4$ to $C_{18}$ mono-olefines, especially those containing up to 12 carbon atoms.

While the invention is not to be considered as depending on any particular theory, it is believed that di- and poly-enes, especially those which are conjugated, inhibit the carbonylation reaction.

Di- and poly-enes are distinguished by having higher densities and refractive indices than the corresponding mono-olefines and their presence is indicated by refractive index measurement or infra red spectroscopy.

Suitably methods of removing the di- and/or poly-enes are, for example, fractional distillation, azeotropic distillation, extractive distillation, solvent extraction with aqueous cuprous salts, such as cuprous chloride, polymerisation, and selective hydrogenation with for example, Cu, Ni or Co catalysts.

Alicyclic mono-olefines are also removed simultaneously to an appreciable degree, although they do not exhibit the same inhibition of carbonylation.

The invention is of especial value in relation to alkenes comprising $C_6$—$C_8$ normal mono-olefines especially alpha-olefines. With these, carbonylation conditions may be 130° to 190° C., with a preferred range of 150°–175° C., and a pressure of $CO/H_2$ mixture of 250 atmospheres gauge, although pressures of 200 to 300 atmospheres gauge are also suitable. Preferably, the cobalt is introduced as a soluble salt of an organic acid dissolved in the liquid feed, e. g., cobalt naphthenate, acetate, laurate, hexahydrobenzoate or 3,5,5-trimethyl hexoate. A particularly valuable application of the process is to the treatment of mixed olefines obtained by thermally cracking higher hydrocarbons, e. g., paraffin wax.

Preferably, the reactor and auxiliary equipment should be lined with CO-resistant material such as copper, which permits the use of $CO:H_2$ mixtures having a composition up to the stoichiometric ratio 1:1.

Saturated aldehydes produced by the process of the invention can be readily hydrogenated to the corresponding alcohol, using, for example, a copper or nickel catalyst, temperatures of about 250° C. and pressures of about 150 atmospheres. Copper on zinc oxide and copper-on-chromia are especially suitable catalysts for the hydrogenation step.

It was found in one particular case that a hydrocarbon cut from a thermally cracked paraffin wax which contained 20% by weight of material of high density and refractive index and which could not be carbonylated under normal conditions, could, after removal of said high density material by fractional distillation, be readily carbonylated.

The resulting mixture which had the composition:

| | Percent by weight |
|---|---|
| Hexene-1 | 50 |
| Heptene-1 | 43 |
| Octene-1 | 7 | was carbonylated with a 1:3 molar mixture of $CO:H_2$ at a temperature of 140° to 180° C. and 250 atmospheres gauge in the presence of 0.1% CO metal employed as naphthenate and present as dissolved cobalt compound with a conversion to oxygenated product of about 80% calculated on the olefine feed.

Example

A $C_6$—$C_8$ cut from the product obtained by thermal cracking of paraffin wax and which contained 50%, $C_6$, 38% $C_7$ and 12% $C_8$ unsaturated hydrocarbons by volume, and of which 14% by volume was material of high refractive index and density ($n_D^{20}$ being greater than 1.425, compared with $n_D^{20}$ for the $C_6$—$C_8$ alkenes of less than 1.415) could not be carbonylated under normal conditions.

The cut was fractionally distilled and during the distillation the interfractions of high refractive index and density ($n_D^{20}$ greater than 1.425), which distilled between the alkenes-1, were removed. The resulting material was carbonylated without difficulty with a gas having the molar ratio $CO:H_2$ of 1:3 at 140° to 180° C. under 250 atmospheres pressure in the presence of 0.1% cobalt, calculated as metal, dissolved in the feedstock as naphthenate. The conversion to oxygenated product was 80%, calculated on the olefine feed.

If selective hydrogenation is employed for removal of the undesirable compounds it is convenient to employ vapour phase reaction over, for example, copper-on-chromia catalyst which may be unsupported or supported, e. g., on silica gel, using suitable conditions of temperature, space velocity and hydrogen: diene or polyene-ratio. Suitable reaction conditions are, for example, a pressure of atmospheric up to 250 lb./sq. inch, a temperature of 180° to 280° C., a space velocity of 200 to 2000 litres/litre of bulk catalyst volume per hour, and a molar ratio of hydrogen to diene or polyene of 1:1 to 5:1.

One suitable form of polymerisation treatment to employ for the removal of the aforesaid compounds is to pass the alkene mixture in the vapour phase over aqueous phosphoric acid supported, for example, on metallurgical coke, operating over a fairly wide range of temperature, contact times, pressures and phosphoric acid dosage, which latter is required to make up losses of catalyst. A range of conditions generally applicable is as follows:

| | |
|---|---|
| Pressure | atmospheric to 100 lbs./sq. inch. |
| Temperature | 150 to 250° C. |
| Contact time | 10 to 500 seconds. |

If it is desired to obtain reduction of di-olefine content to less than 0.4%, it is suitable to use long contact times, e. g., 150 to 250 seconds at about 200° C. and up to 45/lb./sq. inch pressure.

Another suitable form of polymerisation treatment is to use sulphuric acid, a method which has been described in some detail in a paper entitled "Sulphuric Acid Treatment" by F. S. Birch on pages 1769 to 1778 of vol. III of the "Science of Petroleum" (Oxford University Press) 1938. The mixture of alpha-olefines is treated with sulphuric acid, preferably of about 98% strength, in conventional mixing equipment, such as orifice columns or stirred vessels. 0.5% by weight of acid is used, and there may be one or several washes, depending on the content of unsaturated compounds. The acid tar can be removed between each stage, and the final product washed with aqueous caustic soda. After polymerisation treatment the product is re-run in a conventional distillation column in order to remove the polymerisate. A $C_6$ to $C_8$ cut from the product obtained by the thermal cracking of paraffin wax, which had been treated with concentrated sulphuric acid for the removal of highly unsaturated compounds and which had the composition by volume:

| | Percent |
|---|---|
| Hexenes | 50 |
| Heptenes | 42 |
| Octenes | 8 | could be readily carbonylated under the before described conditions with a conversion of 80%, calculated on the olefine feed, to oxygenated products.

In methods of removing the undesirable highly unsaturated compounds by polymerisation it is highly desirable to distil off the desired alkenes from the treated product before the carbonylation step.

What is claimed is:

1. A process for the production of aldehydes from olefine mixtures obtained by cracking hydrocarbons and containing predominantly alkenes and a minor amount of at least one olefine selected from the group consisting of di- and poly-enes, which comprises removing from said mixture the di- and poly-enes which it contains and thereafter continuously carbonylating the resultant liquid mixture with a gas comprising carbon monoxide and hydrogen in which the $CO:H_2$ ratio is from 1:4 up to 2:3 at a temperature of 130° to 190° C. and a pressure of 200 to 300 atmospheres gauge in the presence, as catalyst, of a small cancentration of cobalt of about 0.1% by weight introduced as a soluble organic salt and dissolved in said liquid.

2. A process as claimed in claim 1 in which the content of dienes is reduced to less than 0.4% prior to carbonylation.

3. A process as claimed in claim 1 in which the $CO:H_2$ ratio of the carbonylating gas is at least 1:3.

4. A process as claimed in claim 1 in which the di- and poly-enes are removed by fractionally distilling the starting material and separating during said distillation the interfractions having high refractive index and density.

5. A process as claimed in claim 1 in which the starting material comprises predominantly $C_6$–$C_8$ alkenes and the di- and poly-enes are removed by fractionally distilling the starting material and separating during the said distillation the interfractions having a refractive index $n_D^{20}$ which is greater than 1.425.

6. A process as claimed in claim 1 in which the di- and poly-enes are removed by selective hydrogenation over an active copper catalyst at 180 to 280° C. and at a pressure of up to 250 lb./sq. inch employing a space velocity of 200 to 2000 liters/liter of bulk catalyst volume per hour and a molar ratio of hydrogen to diene of 1:1 to 5:1.

7. A process as claimed in claim 1 in which the di- and poly-enes are removed by polymerizing them by passing the mixture in the vapor phase over aqueous phosphoric acid supported on pieces of inert material at a temperature of 150° to 250° C., and a pressure of from atmospheric up to 100 lb./sq. inch with a contact time of from 10 to 500 seconds.

8. A process as claimed in claim 1 in which the diene content is reduced to less than 0.4% by polymerizing the di- and poly-enes by passing the mixture in the vapor phase over aqueous phosphoric acid supported on pieces of inert material at a temperature of about 200 C., and a pressure of up to 45 lb./sq. inch with a contact time of from 150 to 250 seconds.

References Cited in the file of this patent

UNITED STATES PATENTS

| | | |
|---|---|---|
| 1,982,536 | Perkins | Nov. 27, 1934 |
| 2,328,275 | Heard et al. | Aug. 31, 1943 |
| 2,398,930 | Gary | Apr. 23, 1946 |
| 2,415,102 | Landgraf et al. | Feb. 4, 1947 |
| 2,416,647 | Schulze et al. | Feb. 25, 1947 |
| 2,433,465 | Leum et al. | Dec. 30, 1947 |
| 2,437,600 | Gresham et al. | Mar. 9, 1948 |
| 2,438,444 | Jones et al. | Mar. 23, 1948 |
| 2,497,303 | Gresham et al. | Feb. 14, 1950 |
| 2,517,383 | Brooks | Aug. 1, 1950 |
| 2,530,989 | Parker | Nov. 21, 1950 |
| 2,544,271 | Liedholm | Mar. 6, 1951 |

FOREIGN PATENTS

| | | |
|---|---|---|
| 684,958 | Great Britain | Dec. 31, 1952 |

OTHER REFERENCES

Sachanen: Conversion of Petroleum, 2d ed. Reinhold Publ. Co., N. Y. (1948), page 1.